C. P. BROCKWAY.
ENGINE OILER.
APPLICATION FILED MAR. 5, 1919.
1,437,927.
Patented Dec. 5, 1922.
2 SHEETS—SHEET 1.
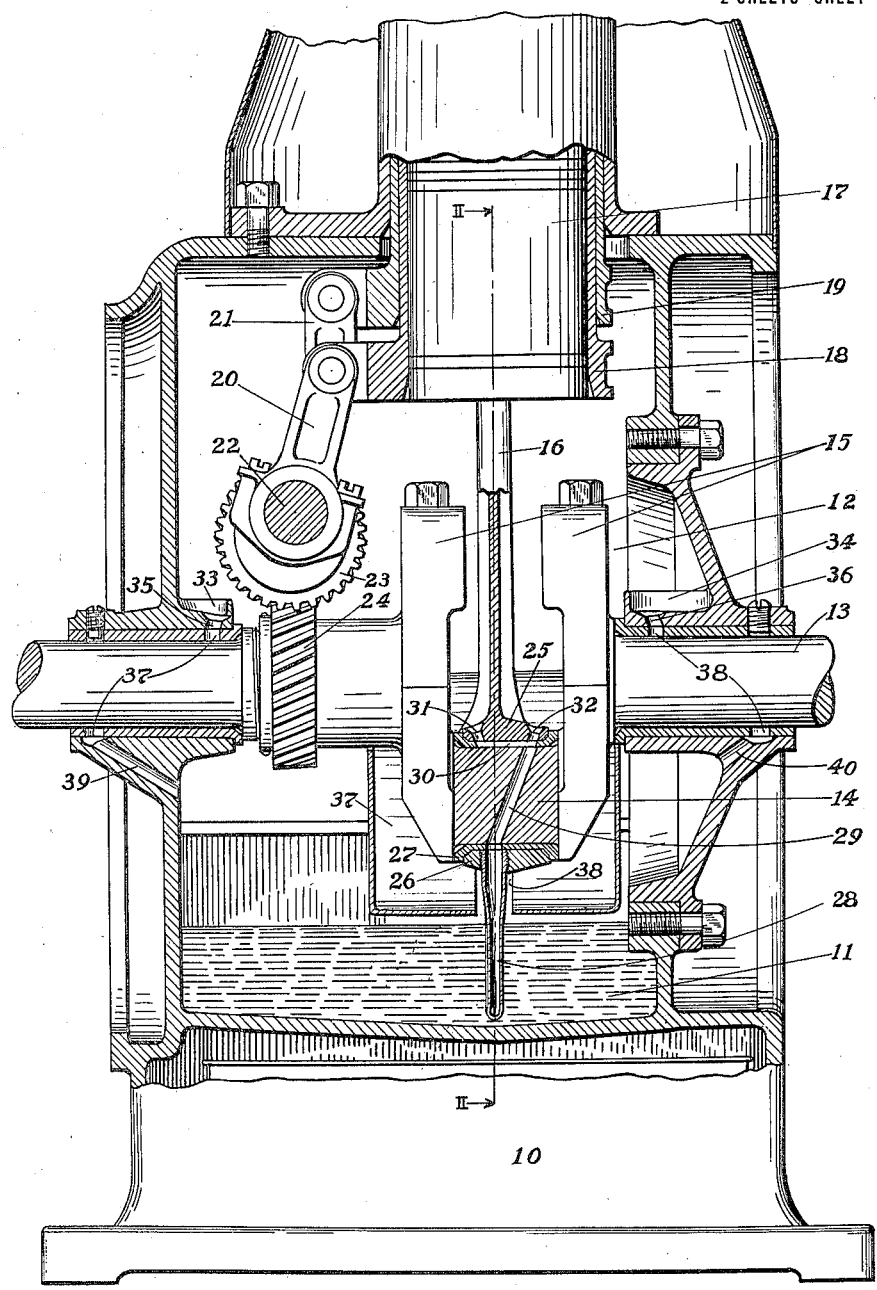
Fig. I.
INVENTOR.
Carl P. Brockway
BY Chester H. Braselton
ATTORNEY

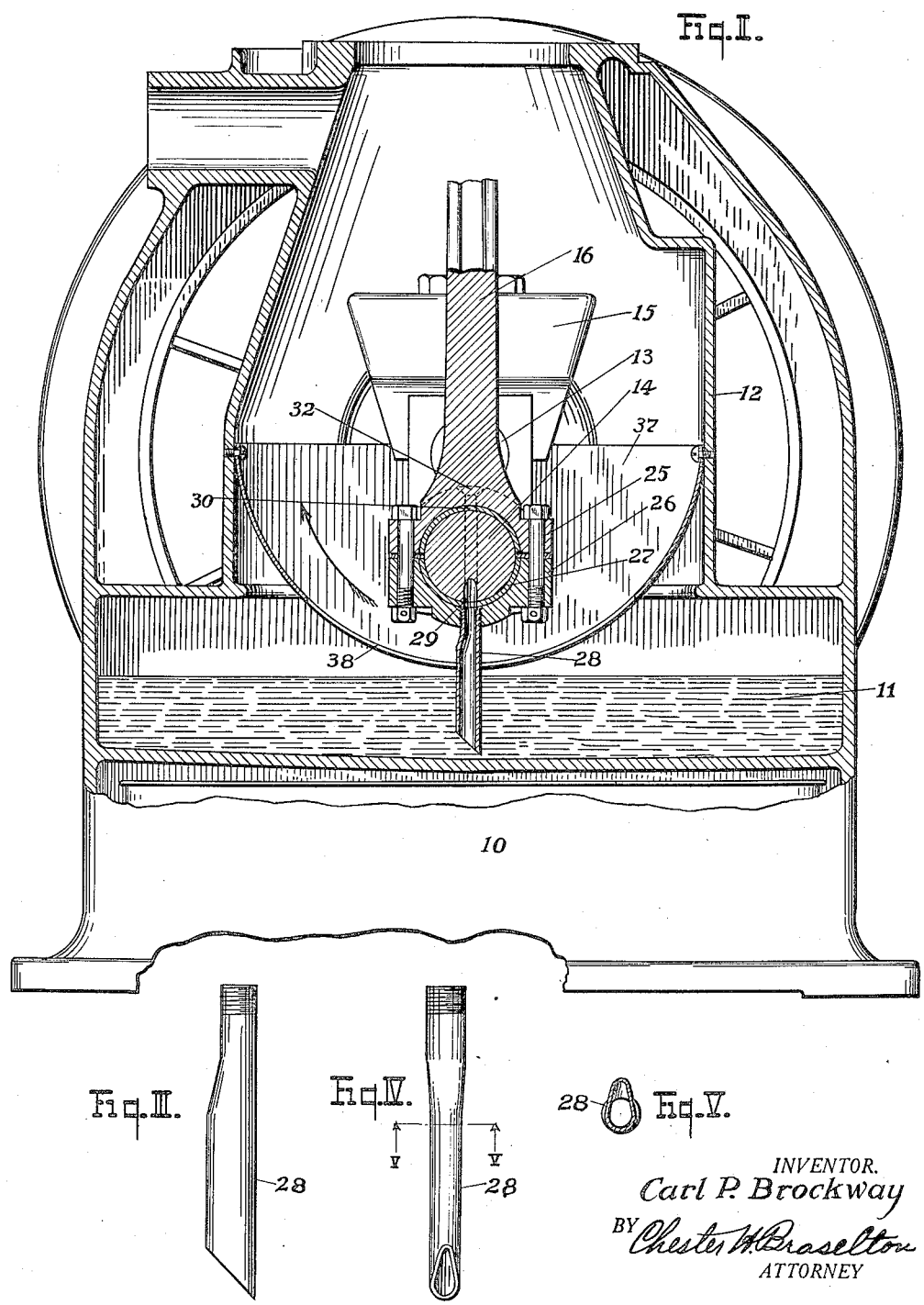

Patented Dec. 5, 1922.

1,437,927

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

ENGINE OILER.

Application filed March 5, 1919. Serial No. 280,727.

*To all whom it may concern:*

Be it known that I, CARL P. BROCKWAY, a citizen of the United States, residing at Toledo, in the county of Lucas and State of Ohio, have invented certain new and useful Improvements in Engine Oilers, of which I declare the following to be a full, clear, and exact description.

This invention relates to improvements in means for lubricating the moving parts of an engine, particularly an internal combustion engine.

One object of the invention is the provision of lubricating means for the purpose specified, which shall be simple in construction and inexpensive to manufacture.

Another object of the invention is the provision of an efficient lubricating means which comprises no valves, pistons or other moving parts likely to get out of order.

Still another object is the provision of a measured amount of lubrication at all times, regardless of the amount of oil in the oil reservoir.

Other objects, and objects relating to details of construction and economies of manufacture, will appear as I proceed with the description of that embodiment of the invention which, for the purposes of the present application, I have illustrated in the accompanying drawings, in which:

Figure I is a view, principally in vertical section, of an internal combustion engine, embodying my invention.

Fig. II is a view principally in vertical section on the line II—II, Fig. I.

Fig. III is a detail side elevational view of the tube constituting a part of my invention.

Fig. IV is a detail elevation taken at right angles to Fig. III.

Fig. V is a cross section taken on the line V—V, Fig. IV.

Similar reference characters refer to similar parts throughout the views.

In the drawings, 10 indicates the base of a gas engine, supporting a reservoir 11 for lubricating oil, the upper portion of the reservoir being in open communication with a crank case 12, in which are supported bearings for a crank shaft 13, carrying a crank pin 14, and counterweights 15. The crank pin 14 drives a connecting rod 16, the upper end of which is mounted in a piston 17, which has its sliding bearing in the inner one of two valve sleeves 18 and 19 driven by connecting rods 20 and 21 from an eccentric shaft 22, which receives its motion from the crank shaft through a pair of intermeshing spiral gears 23 and 24. Now, although I have shown my invention as applied to a sleeve valve type of engine, such showing is for purposes of illustration only, the invention being applicable to all types of stationary cylinder engines, and indeed to other machinery such, for instance, as air compressors.

The connecting rod 16 is mounted upon the crank pin 14 by means of a split bearing consisting of an upper half 25, which is integral with the connecting rod, and a lower half 26, usually termed a cap, which is bolted to the upper half 25. Within the bearing members 25 and 26 is a split bushing 27 directly surrounding the crank pin 14. In the bottom of the cap 26 is mounted by thread screws, or otherwise, a tube 28, which dips into the oil in the reservoir 11 each time that the connecting rod descends. It is made of such length that it will just clear the bottom of the reservoir. Below its connection with the cap 26, the tube 28 is flattened on its sides, which are inclined together toward the front, so as to form a liquid cutting edge in order to reduce the friction caused by the rapid movement of the tube through the oil. The lower end of the tube is cut on an incline, which slopes downwardly from front to rear. This inclined surface is substantially perpendicular to the path of movement of the mouth of the tube through the oil up to the time when it reaches its greatest depth in the oil, and hence it facilitates the movement of the oil into the tube.

A passage 29 is bored through the crank pin 14 and bushing 27 in such a position as to bring its lower end into register with the upper extremity of the tube, when the latter is in its lowermost vertical position. The passage 29 is shown straight, which is the preferred construction because of the fact that it can be readily produced, and also because a straight passage offers the least frictional resistance to the flow of a liquid therethrough. When the parts are in the position illustrated in the drawing, the passage 29 registers at its upper end with a slot 30 in the bushing 27, connected with which are holes 31 and 32 in the bearing 25, said holes opening on the two opposite sides of the piston rod or connecting rod 16.

The bearings for the crank shaft 13 are provided with cups 33 and 34, which catch oil thrown or sprayed into them and direct it through openings 35 and 36 into spiral passages 37 and 38 in the journal bushings, which in turn empty into ducts 39 and 40 leading back to the oil reservoir 11. Below the crank shaft and in position to be entered by the cranks and crank pin I mount a pan 37, preferably having a semi-cylindrical bottom and vertical sides. In the lower middle portion it is cut away to form a slot 38, through which the tube 28 moves during the lower part of its travel. This pan acts as a guard to prevent the splash caused by the tube from rising onto the cranks, crank pin or counterweights. Such splash is not desirable because the amount of it would depend upon the depth of oil in the reservoir, and one of the objects of this invention is to provide a measured lubrication at all times, regardless of the amount of oil in the reservoir.

The operation of my invention will be obvious from the above description. The engine shaft rotates in a clockwise direction, as viewed in Fig. II. From the time the tube 28, on each downward stroke, first strikes the oil until it reaches the position illustrated in the drawings, it is compressing the oil and air within itself, and because of the rapid motion this pressure is considerable. Now, when it reaches the position illustrated, it is suddenly brought into register with passages 29, 30, 31 and 32, and the pressure is relieved by a sudden upward movement of the confined oil, which spurts from the passages 31 and 32 up onto the counterweights 15. From the latter it is thrown by centrifugal force to the various parts of the engine requiring lubrication. This spurting of the oil is momentary only, for the passage 29 remains in register with the tube 28 and with the passage 30 through a very brief interval. Thereafter oil which is caught in the passage 29 remains there until the parts again take the position shown in the drawings, except that a very little oil may be thrown from the holes 31 and 32, when the crank pin 14 is at its highest position, at which time the end of the passage 29, shown lowermost on the drawing, will register with the passage 30. At such time however, the opposite end of the passage will be sealed and consequently air pressure will hold most, if not all, of the charge of oil in place. Furthermore, the tube 28, being small in cross sectional area and being sealed at the top, will retain a large part of its charge also. Hence upon the next revolution when the parts assume the position illustrated in the drawing, the tube 28 and the passage 29 being both charged with oil, the fluid pumped out of the holes 31 and 32 will be practically all oil instead of air and oil. Passage 30, in addition to constituting a path for the movement of oil to the passage 31, acts also as an oil chamber from which the bearing for the crank pin 14 takes its lubrication very effectively.

I am aware that the particular embodiment of my invention above described, and illustrated in the accompanying drawings, is susceptible of considerable variation without departing from the spirit thereof, and therefore I desire to claim my invention broadly as well as specifically, as indicated by the appended claims.

I claim as my invention:

1. In an engine, a crank shaft, a crank case having an oil reservoir, a crank pin on said shaft having an oil passage therethrough, a connecting rod carrying a bearing surrounding said crank pin, a tube, the upper end of which is mounted in said bearing and the lower end of which is adapted to dip into the oil in said reservoir, said oil passage and tube being arranged to register while the lower end of the tube is in the oil, and means for distributing the oil from the opposite end of said passage.

2. In an engine, a crank shaft, a crank case having an oil reservoir, a crank pin on said shaft having an oil passage therethrough, the opposite ends of the passage being in different vertical transverse planes, a connecting rod carrying a bearing surrounding said crank pin, a tube, the upper end of which is mounted in said bearing and the lower end of which is adapted to dip into the oil in said reservoir, said tube being arranged to register with one end of said oil passage while the lower end of the tube is in the oil, and means for distributing oil from the opposite end of said passage.

3. In an engine, a crank shaft, a crank case having an oil reservoir, a crank pin on said shaft having an oil passage therethrough, counterweights carried by said shaft, a connecting rod having a bearing surrounding said crank pin, said bearing having upper and lower oil passages therethrough, a tube, the upper end of which is mounted in said bearing at the lower oil passage and the lower end of which is adapted to dip into the oil in said reservoir, said upper and lower oil passages being arranged to register with said crank pin oil passage while the lower end of the tube is in the oil, whereby oil will be forced through the tube and passages onto said counterweight, and thrown therefrom to other parts of the engine.

4. In an engine, a crank shaft, a crank case having an oil reservoir, a crank pin on said shaft having an oil passage therethrough, the opposite ends of the passage being in different vertical transverse planes, counterweights carried by said shaft, a connecting rod having a bearing surrounding said crank pin, said bearing having upper and lower oil passages therethrough, a tube, the upper end of which is mounted in said bearing at the lower oil passage and the lower end of which is adapted to dip into the oil in said reservoir, said upper and lower oil passages being arranged to register with said crank pin oil passage while the lower end of the tube is in the oil, whereby oil will be forced through the tube and passages onto said counterweights, and thrown therefrom to other parts of the engine.

5. In an engine, a crank shaft, a crank case having an oil reservoir, a crank pin on said shaft having an oil passage therethrough, counterweights carried by said shaft, a connecting rod having a bearing surrounding said crank pin, said bearing having a lower oil passage therethrough and two upper interconnected passages therethrough opening on to opposite sides of said connecting rod, a tube, the upper end of which is mounted in said bearing at the lower oil passage and the lower end of which is adapted to dip into the oil in said reservoir, said upper and lower oil passages being arranged to register with said crank pin oil passage while the lower end of the tube is in the oil, whereby oil will be forced through the tube and passages onto said counterweights, and thrown therefrom to other parts of the engine.

6. In an engine, a crank shaft, a crank case having an oil reservoir, a crank pin on said shaft having a straight oil passage therethrough, the opposite ends of the passage being in different vertical transverse planes, a connecting rod carrying a bearing surrounding said crank pin, a tube, the upper end of which is mounted in said bearing and the lower end of which is adapted to dip into the oil in said reservoir, said tube being arranged to register with one end of said oil passage while the lower end of the tube is in the oil, and means for distributing the oil from the opposite end of said passage.

7. In an engine, a crank shaft, a crank case having an oil reservoir, a crank pin on said shaft, a connecting rod carrying a bearing surrounding said crank pin, a tube mounted in and extending downwardly from said bearing and adapted to dip into the oil in said reservoir, means for distributing oil from the upper end of said tube, and a guard plate beneath said crank shaft for downwardly deflecting oil splashed by said tube.

8. In an engine, a crank shaft, a crank case having an oil reservoir, a crank pin on said shaft, a connecting rod carrying a bearing surrounding said crank pin, a tube mounted in and extending downwardly from said bearing and adapted to dip into the oil in said reservoir, means for distributing oil from the upper end of said tube, and a guard plate mounted beneath said crank shaft and having a slot through which the tube moves during the lower part of its travel, said plate being adapted to deflect downwardly the oil splashed by said tube.

9. In an engine, a crank shaft, a crank case having an oil reservoir, a crank pin on said shaft having an oil passage therethrough, a connecting rod carrying a bearing surrounding said crank pin, said bearing having a cavity connecting with its bearing surface, means for conducting oil to said cavity, said means comprising a tube, the lower end of which is adapted to dip into the oil in said reservoir, said oil passage and cavity being arranged to register while the lower end of the tube is in the oil, and means for distributing the oil from the opposite end of said passage.

10. In an engine, the combination of a crank shaft having a normal direction of rotation; a crank pin; a connection rod secured to the crank pin; an oil reservoir adjacent the crank pin; an oil scoop tube secured to the connecting rod and adapted to enter the oil in said reservoir; said tube having a lower end opening inclined upwardly and in the direction of rotation whereby oil is forced up the tube when the tube is moving through the oils in a vertical position; and means for distributing oil from the upper end of the tube.

In testimony whereof I affix my signature.

CARL P. BROCKWAY.